(12) United States Patent
Bashir

(10) Patent No.: US 9,848,633 B2
(45) Date of Patent: Dec. 26, 2017

(54) ACCESSIBLE, FLUID TAHINI FOR USE IN A SQUEEZED BOTTLE AND PROCESS FOR ITS PREPARATION

(71) Applicant: Rushdi Food Industries Ltd., Afula (IL)

(72) Inventor: Ibrahim Bashir, Um el Fahem (IL)

(73) Assignee: Rushdi Food Industries Ltd., Afula (IL)

( * ) Notice: Subject to any disclaimer, the term of this patent is extended or adjusted under 35 U.S.C. 154(b) by 0 days.

(21) Appl. No.: 15/465,310

(22) Filed: Mar. 21, 2017

(65) Prior Publication Data

US 2017/0188615 A1 Jul. 6, 2017

Related U.S. Application Data

(63) Continuation of application No. 15/189,578, filed on Jun. 22, 2016.

(30) Foreign Application Priority Data

Jun. 22, 2015 (IL) .......................................... 239576

(51) Int. Cl.
  *A23L 1/36* (2006.01)
  *A23L 27/60* (2016.01)
  *A23L 25/00* (2016.01)

(52) U.S. Cl.
  CPC ............... *A23L 27/60* (2016.08); *A23L 25/30* (2016.08); *A23V 2002/00* (2013.01)

(58) Field of Classification Search
  CPC ........... A23L 25/30; A23L 25/60; A23L 27/80

(Continued)

(56) References Cited

U.S. PATENT DOCUMENTS 2,282,818 A * 5/1942 Musher .................... A23L 7/152
                                                              426/542
5,529,802 A    6/1996 Schimmel

FOREIGN PATENT DOCUMENTS

| JP | 2008-86213 A | 4/2008 |
| JP | 2014-60931 A | 4/2014 |
| KR | 10-0994753 B1 | 11/2010 |

OTHER PUBLICATIONS

De-Hulling, https://sproutpeople.org/growing-sprouts/sprouting-basics/de-hulling/, pp. 1-5, 2014, date shown by Internet Archive Wasyback Machine, one page.*

(Continued)

*Primary Examiner* — Helen F Heggestad
(74) *Attorney, Agent, or Firm* — Vorys, Sater, Seymour & Pease LLP

(57) ABSTRACT

Provided is a method for preparing a raw food product with particles of ground roasted sesame seeds dispersed in sesame oil, the raw food product including particles having an average size of between about 15 μm to about 40 μm, being thixotropic, with a viscosity, of between about 700 cps to about 2,500 cps, being maintained as a single liquid phase for a time period of at least six months when stored at room temperature, the method including hulling sesame seeds by stirring sesame seeds, suspended in an aqueous media, at a velocity of less than 400 rpm, to obtain sesame kernels, roasting the sesame kernels to obtain roasted kernels, and subjecting the roasted kernels to two or more milling stages in a ball mill device to obtain the raw food product.

15 Claims, 2 Drawing Sheets

(58) Field of Classification Search
USPC .................................................. 426/518, 629
See application file for complete search history.

(56) References Cited

OTHER PUBLICATIONS

Altay et al., "Effects of temperature, shear rate and constituents on rheological properties of tahin (sesame paste)", J Sci Food Agric. (2005) 85: 105-111.
Ciftci et al., "Colloidal stability and rheological properties of sesame paste", Journal of Food Engineering. (2008) 87: 428-435.
El-Adawy et al., "Nutritional and physicochemical evaluations of tahina (sesame butter) prepared from heat-treated sesame seeds", J Sci Food Agric. (2000) 80: 2005-2011.
El Khier et al., "Chemical Composition and Oil Characteristics of Sesame Seed Cultivars Grown in Sudan", Research Journal of Agriculture and Biological Sciences. (2008) 4(6): 761-766.
https://www.youtube.com/watch?v=Q8vsPFK_UJc published Jul. 24, 2012.

* cited by examiner

US 9,848,633 B2

ACCESSIBLE, FLUID TAHINI FOR USE IN A SQUEEZED BOTTLE AND PROCESS FOR ITS PREPARATION

TECHNOLOGICAL FIELD

The present disclosure refers to fluid food products and specifically to fluid sesame seeds based food products.

BACKGROUND ART

References considered to be relevant as background to the presently disclosed subject matter are listed below:
El Khier, M. K. S., Ishag K. E. A., & Yagoub A. E. A. (2008). Chemical Composition and Oil Characteristics of Sesame Seed Cultivars Grown in Sudan. *Research Journal of Agriculture and Biological Sciences*, 4(6): 761-766.

Acknowledgement of the above references herein is not to be inferred as meaning that these are in any way relevant to the patentability of the presently disclosed subject matter.

BACKGROUND

Sesame seeds play an important role in human nutrition. Most of the sesame seeds are used for oil extraction and the rest are used for edible purposes (El Khier et al, 2008).

Sesame seeds are a common ingredient in various cuisines. In some cases, the seeds are processed into Tahini which is a paste made from ground hulled sesame seeds. Tahini is served as a dip or as a component of other food products such as hummus and halva. Being an excellent source of essential nutrients, such as calcium, copper, manganese, protein, omega-3, omega-6, and fibers, yet low in levels of sugar and saturated fats, Tahini is favored by health-oriented cuisines as well as by vegetarians and vegans.

Tahini is typically made by first soaking the sesame seeds in water and then crushing to separate the bran from the kernels. The crushed seeds are soaked in salt water, causing the bran to sink. The floating kernels are skimmed off the surface, roasted, and ground to produce an oily paste which is the raw Tahini product. Because of Tahini's high oil content, oiling off may occur following storage.

GENERAL DESCRIPTION

In accordance with some aspects, the present disclosure provides a raw food product comprising ground roasted sesame seeds dispersed in sesame oil, the raw food product being characterized by at least one, at times at least two, preferably all of the following: (a) particles having an average size of between about 15 µm to about 70 µm; (b) being thixotropic, with a viscosity of between about 700 cps to about 2,500 cps; (c) being maintained as a single liquid phase for a time period of at least six months when stored at room temperature.

In accordance with a second aspect, the present disclosure provides a method for preparing the raw food product disclosed herein, the method comprising (i) hulling sesame seeds by stirring sesame seeds, suspended in an aqueous media, at a velocity of about 170 rpm to about 220 rpm, to obtain sesame kernels; (ii) roasting the sesame kernels to obtain roasted kernels; (iii) subjecting the roasted kernels to a size reduction method to obtain said raw food product.

In some embodiments, the method comprises crushing the roasted kernels to obtain crushed kernels (i.e. small pieces of particles).

In some embodiments, the method comprises subjecting the crushed kernels to two or more milling stages, preferably, in a ball mill device, to thereby obtain the raw food product.

In accordance with yet another aspect, the present disclosure provides a ready for use food product comprising a homogenous emulsion of raw food product as disclosed herein in water.

Finally, provided is a method for preparing the ready for use food product, the method comprises mixing the raw food product disclosed herein with an amount of water sufficient to obtain a homogenous emulsion of a ready for use food product.

BRIEF DESCRIPTION OF THE DRAWINGS

In order to better understand the subject matter that is disclosed herein and to exemplify how it may be carried out in practice, embodiments will now be described, by way of non-limiting example only, with reference to the accompanying drawings, in which.

DETAILED DESCRIPTION OF EMBODIMENTS

Figure 1:
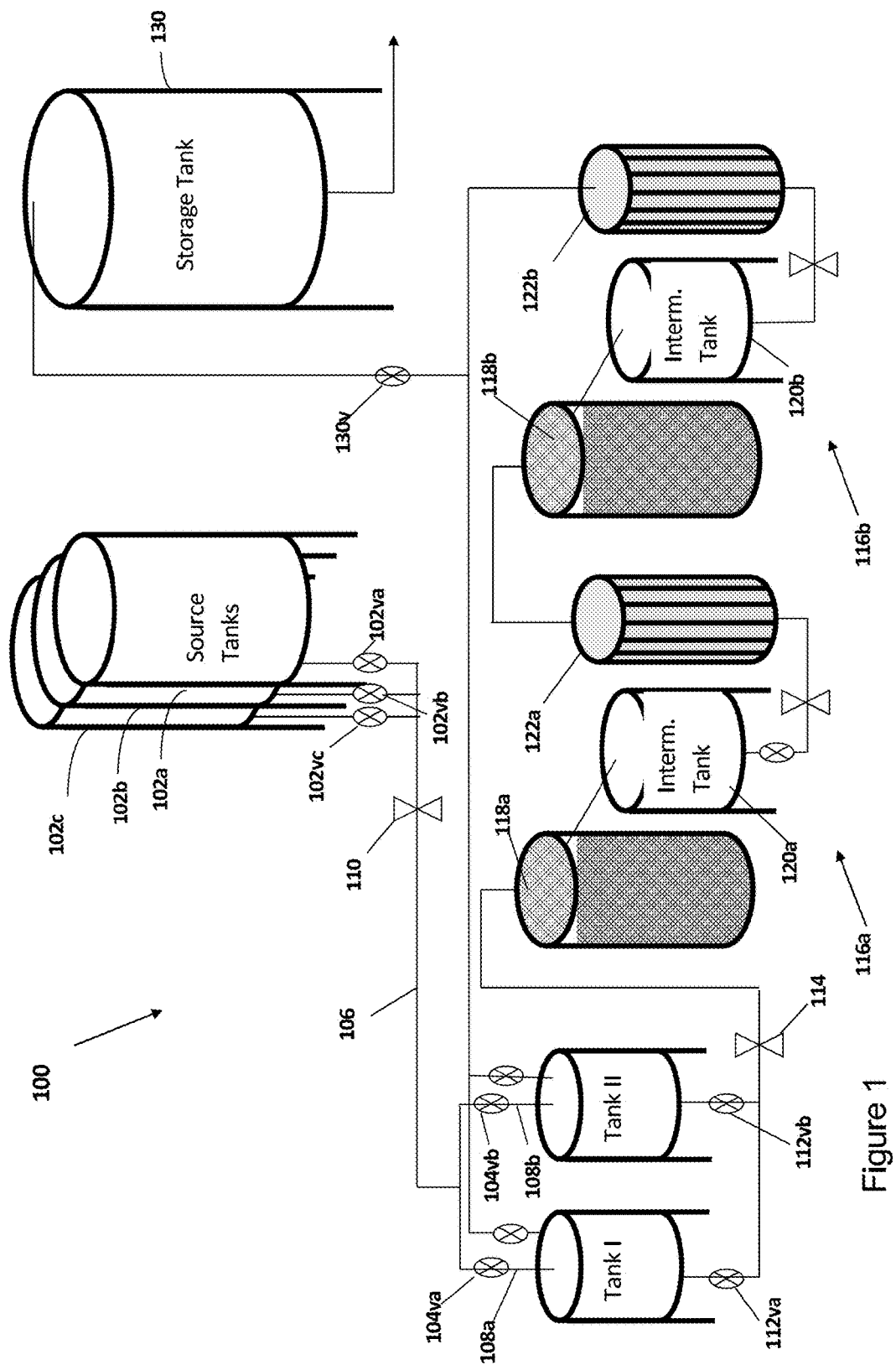
FIG. 1 is a schematic illustration of a milling system in accordance with an embodiment of the present invention.

The present disclosure is based on the development of raw Tahini that is unexpectedly stable during long term storage to an extent that no oiling off or phase separation was observed after even 6 months of storage at room temperature. The raw Tahini product is characterized by additional features as further discussed below.

For the sake of simplicity, when referring in the context of the present disclosure to raw Tahini it is to be understood as meaning a fluid food product made of ground sesame seeds; and when referring to "ready for use" Tahini it is to be understood as meaning raw Tahini after being diluted with another fluid such as water, lemon juice or the like. In other words, the raw food product in accordance with the present disclosure denotes an edible food product that may be consumed as obtained, or may serve in preparation other food products, such as dips, salad sauce etc. By the use of the term "raw" it is to be understood as a product produced essentially only from the natural/original source of the food product, and in this particular case, from sesame seeds, without the addition of other substances. In other words, the raw food product contains at least 98% of only the source from which it is produced, i.e. at least 98%, at times, at least 99% and further at times 100% of only the original source (the sesame seeds).

The inventors have found that grinding (e.g. crushing, milling) hulled and roasted sesame seeds using sequential grinding steps, particularly in a ball mill, resulted in a homogenous emulsion carrying ground sesame particles having an essentially uniform size distribution and this homogenous raw product is stable, i.e. has no apparent phase separation during storage (i.e. no oiling off, as further discussed below).

As appreciated, "oiling off" concerns the uncontrolled separation of oil out of a food product, as occurs not only with Tahini, but also with cheese, halva etc., a phenomena that deteriorates the quality of the food product in time. Such phase separated food products are often considered by consumers as damaged, spoiled and having low quality. As such, avoiding or preventing oiling off is a challenge in the food industry and the inventors of the present disclosure developed a food product that is stable as a single homogenous phase, namely no-phase separation as a result of long term storage.

Further, it has been found that the raw Tahini product of the present disclosure is thixotropic, i.e. it turns less viscous (more flowable) when being subjected to shear forces, such as shaking, agitation, or otherwise being stressed.

Thus, based on the present finding there is disclosed a raw food product comprising particles of ground roasted sesame seeds dispersed in sesame oil, the raw food product being characterized by the following: (a) the particles have an average size/diameter between about 15 μm to about 40 μm, at times between about 20 μM to about 40 μM; (b) being maintained as a single liquid phase for a time period of at least six months when stored at room temperature. (c) being thixotropic, with a viscosity of between about 700 cps to about 2,500 cps, at times, between about 1,000 cps to about 2,000 cps.

Further, based on the present finding there is provided a method for producing the raw food product, the method comprising (i) hulling sesame seeds by stirring sesame seeds, suspended in an aqueous media, at a velocity of about 170 rpm to about 220 rpm, to obtain sesame kernels; (ii) roasting the sesame kernels to obtain roasted kernels; and (iii) crushing the roasted kernels; and (iv) subjecting the crushed kernels to two or more milling stages in a ball mill device to obtain said raw food product.

Sesame seeds are well known in the art as the seeds of the sesame plant (*Sesamum indicum* or benniseed). The seeds are characterized as being rich in oil, proteins, carbohydrates, fibre, minerals and vitamins and are widely used in the food industry. Sesame seeds are ovate, slightly flattened and have a weight of between 20 and 40 milligrams. Their colors vary throughout the different available varieties, including off-white, buff, tan, gold, brown, reddish, gray and black.

The sesame seeds from which the raw food product is produced are, in accordance with some embodiments, mature seeds, namely, seeds that have reached their full maturity. Maturity of seeds is understood by those versed in the art. For example, Growers Guides [Sesaco, Sesame Coordinators by D. Ray Langham, Jerry Riney, Glenn Smith, and Terry Wiemers March 2008] define the following phases and stages of sesame growing, including the stage of maturation:

| Phase/Stage | End point of stage | DAP/Week* |
|---|---|---|
| Vegetative | | |
| Germination | Emergence | 0-5-1 |
| Seedling | 3$^{rd}$ pair true leaf length = 2$^{nd}$ | 6-25 |
| Juvenile | First buds | 26-37 |
| Pre-reproductive | 50% open flowers | 38-44 |
| Reproductive | | |
| Early bloom | 5 node pairs of capsules | 45-52 |
| Mid bloom | Branches/minor plants stop flowering | 53-81 |
| Late bloom | 90% of plants with no open flowers | 82-90 |
| Ripening | Physiological maturity (PM) | 91-106 |
| Drying | | |
| Full maturity | All seed mature | 107-112 |
| Initial drydown | 1$^{st}$ dry capsules | 113-126 |
| Late drydown | Full drydown | 127-146 |

*DAP = days after planting/weeks in stage. In some embodiments, the mature sesame seeds are white, pearl white or whitish seeds.

In some embodiments, the mature sesame seeds have a weight of between about 10 mg to about 50 mg, at times between about 20 mg to about 40 mg.

In some further embodiments, the sesame seeds have a length (i.e. one dimension) of between about 2.5 mm to about 4.5 mm, a width (i.e. another dimension, different from the length) 0f about 1 mm to about 3 mm and thickness (i.e. a dimension different from the length and width) of between about 0.5 mm to about 1.5 mm, at times a length between about 3 mm to about 4 mm, a width of about 2 mm±0.5 mm and thickness of about 1 mm±0.5 mm.

The sesame seeds can also be characterized by the moisture content prior to processing according to the method disclosed herein. In some other embodiments, the sesame seeds have no more than 8% moisture prior to applying the hulling step, at times between about 2% w/w to about 8% w/w moisture, at times between about 2% to about 6% moisture prior to applying the hulling step.

The sesame seeds can also be characterized by the oil content. In some embodiments, the sesame seeds comprise between about 45% w/w to about 65% w/w oil content, at times, between 50% to 60% oil content.

The sesame seeds can also be characterized by the protein content. In some embodiments, the sesame seeds comprise at least 15% protein content, at times, at least 18% protein content, and/or from about 18% w/w to about 30% w/w protein content, at times from about 22% to about 30% protein content.

In some embodiments, the sesame seeds comprise 55%±5% oil content and 26%±5% protein content out of the total weight of the seeds prior to hulling.

In some embodiments, the sesame seeds are Ethiopian sesame. There are various varieties of Ethiopian seeds including, without being limited thereto, White Humera, Gonder, Wollega, Radish, Mixed, Gedaref, Organic seeds.

In accordance with the present disclosure the Ethiopian sesame seeds are those characterized by at least one of the following: natural whitish or pearly white color seeds, minimal oil content of 40-50% w/w, preferably at least 50%, maximal moisture content of 8% w/w, preferably maximal content of 6%, thousand seed weight greater than 3 g, protein content of 18%-30% w/w, at times, 19%-28%. At times, the sesame seeds are regarded as having 99% purity. Further, the Ethiopian seeds are free from dead or alive insects or other infestation.

In some embodiments, the sesame seeds are while Humera type Ethiopian sesame seeds.

In some other embodiments, the sesame seeds are Gondar type Ethiopian sesame seeds.

In some other embodiments, the sesame seeds are a mixture of sesame seeds comprising at least seeds from Ethiopian origin, i.e. Ethiopian sesame seeds.

The raw food product, i.e. the raw Tahini, comprises the ground roasted sesame seed particles dispersed in sesame oil that is derived from the seeds during the process of production of the raw product. Thus, the raw food product is a fluid product.

As noted above, the raw food product exhibits thixotropic properties. Thixotropy, i.e. it's viscosity decreases over time while being subjected to shearing forces, while after a time period in rest state (i.e. no stress applied), the material returns completely to its original viscosity. In some embodiments, the raw food product is characterized by a viscosity upon stress of between 700 cps to 2,500 cps. In some embodiments, the viscosity is between about 1,000 cps to about 2,000 cps at rest (i.e. when no shear forces are applied).

The raw food product in accordance with the present disclosure comprises milled roasted sesame seeds of a size of less than 40 μm.

When referring to roasted sesame seeds it is to be equivalently regarded as roasted seeds with the meaning of being subjected to controlled heating at temperatures of less than 100° C., at time, less than 80° C., less than 70° C., less than 60° C., or even less than 50° C. that while being browned, the seeds are not burnt.

Further, as noted above, the raw food product, namely, the raw Tahini, comprises particles of the roasted sesame seeds. As further described below, the overall grinding (including milling and/or crushing) is conducted to obtain particles of essentially uniform size, having an average size larger than 15 μm. In some embodiments, the particles average size is between about 15 μm to about 40 μm. In some embodiments, the particles average size is between about 20 μM to about 40 μM.

As further noted above, the raw food product is stable during storage. The term stable in connection with the present disclosure denotes that the raw material maintains a homogeneous uniform fluid phase. In other words, in time there is essentially no separation into two immiscible layers.

Stability in the context of the present disclosure is determined following the product storage. In some embodiments, the product described herein is stable for at least 1 month when stored at room temperature, at times for at least 2 month, at times for at least 3 month, at times for at least 4 month, at times for at least 5 month, at times for at least 6 month, at times for at least 8 month, at times for at least 12 month.

Further characteristics of the raw food product (i.e. raw Tahini) relate to its ability to hold water when mixed with water. It has been found that the raw food product (raw Tahini) disclosed herein and being characterized by the particles dimensions defined herein, is capable of holding an amount of water that is greater than the amount of water held by raw Tahini differently produced. When referring to a different production, it is meant that at least the size of the particles dispersed in the sesame oil are greater than about 40 μm, at times greater than 60 μm and the raw Tahini thus obtained has a viscosity of more than 2,500 cps, at times even more than 4,000 cps.

In some embodiments, it has been found that the raw food product disclosed herein holds at least 10% w/w, at times, at least 20%, or at least 30% more water than a commercial raw Tahini product. The ability of the raw Tahini to hold water can be defined by the amount of water that it is capable of holding (being mixed with) while still maintaining its homogenous and uniform form. "Holding" also refers to the capability of being mixed with water and yet being maintained as a single phase, i.e. without breaking. A "broken" Tahini is one where the protein containing matter agglomerates or aggregates in the fluid oily medium and this agglomeration is visible to the eye. In this connection while commercially available raw Tahini are typically capable of holding water at a raw Tahini to water ratio of 1:1, the raw food product (raw Tahini) produced according to the present disclosure is capable of holding water at a Tahini to water ratio of between 1.1:1 and 1.5:1, at times, between 1.1:1 to 1.3:1, or at times, between 1.2:1 to 1.3:1.

Yet, further characteristics of the raw food product relate to its protein content. In some embodiments, the raw food product comprises a protein content between about 20% w/w to 40% w/w greater than the protein content in commercial raw Tahini. In some embodiments, the raw Tahini comprises at least 20%, at times, between 20-30%, at times about 24%±3% protein.

As noted above, the raw food product can be prepared by a method generally comprising the steps of hulling sesame seeds, roasting the hulled seeds, and particulating (downsizing/grinding) the hulled seeds.

At times, prior to performing the above method steps, the sesame seeds are first pre-treated to remove undesired material. Sesame seeds are harvested from the fruits of the sesame flower and may contain sand, dust, dirt, etc. Therefore, the sesame seeds can initially sifted in order to remove the undesired residual material that was collected with the seeds. In this context, undesired residual material means primarily inorganic material and synthetic and without being limited thereto includes sand, dust, dirt.

In some embodiments, the sesame seeds are sifted using a sifter having a mesh opening such that the seeds pass through and collected while the undesired residual material is retained on the sifter. In some embodiments, the sifter has mesh openings between about 0.75 mm to about 1.7 mm, at times between about 0.9 mm to about 1.5 mm, further at times between about 1 mm to about 1.2 mm. In some embodiments, the sifter has mesh openings of about 1 mm±0.2 mm. During the sifting process, between 1% to 25% of undesired residual material is removed, at times between 1.5% to 20% In some embodiments, the seeds (sifted or not) are washed. Washing can be done with any aqueous solution, for example, with water or with saline water. This facilitates, inter alia, washing off pesticidal material or any other material. The wash may be performed by any one or combination of soaking, rinsing, immersing, suspending, or any other form of contacting the seeds with water (or other aqueous solution) without damaging the integrity of the kernels.

In one embodiment, the seeds (sifted or not) are washed with water.

Hulling of the seeds includes removing of the coating of the seeds ("de-coating" or "de-corticated"). In some embodiments, hulling is achieved by suspending the seeds in an aqueous media (typically water) for at least 30 min., at times, for between 10 min to 60 min, at times between 15 min to 30 min, or between 10 min to 15 min or, at times, for about 22 min±5 min. The suspended seeds are then gently stirred or agitated, e.g. stirring at a velocity of no more than 400 rpm, at times, no more than 300 rpm, at times at a velocity of about 170 rpm to about 220 rpm. The gentle action is necessary in order to avoid damage to the hulled seeds.

At times, the gentle stirring can be conducted immediately or shortly after introducing the seeds into the aqueous media (i.e. simultaneously), although preferably the seeds are first suspended in the water and only after time, are subjected to the gentle mixing. The velocity can vary depending on the type of device used at this stage. The stirring of the water suspended seeds is controlled and requires minimal or no shear forces on the seeds, such that essentially all hulled kernels are maintained intact without any damage.

The hulled seeds, referred to herein also as "hulled kernels" or "kernels" are maintained under condition to keep the moisture of the hulled kernels at a level of between about 40% to about 50%, at times 45%±2%. The moisture content of the hulled kernels can be determined by any known method in the field, for example by weighting samples and then drying them and calculating the differences in weight which is indicative of the weight of water removed by drying.

The wet kernels are then subjected to a heating process at temperatures that do not damage the integrity of the protein in the kernel or cause oxidation of the oils therein. The hulled sesame kernels are subjected to heating to provide roasted kernels. In the context of the present disclosure, the term "roasted kernels" refers to hulled kernels that underwent at least a heating process. Heating is done by techniques known in the industry. In some embodiments, roasting is conducted using a steam oven. It is essential that the roasting be at temperatures that do not affect the kernel's nutritional values, aroma and taste, or cause damage to the protein content or promote oxidation of the lipids and oils in the seeds. To this end the protein amount and quality in the kernels are constantly tested during roasting, for example from extracts derived using n-hexane as a solvent to ensure the protein quality and surface activity. In some embodiment, roasting is at temperatures above 100° C., at times, above 110° C., at times, above 120° C. but typically not more than 140° C., and preferably not more than 130° C.

It is noted that the hulled kernels are not necessarily separated from the hull at the roasting stage and the heating is conducted on the "mixture" of hulls and hulled/de-coated kernels. At times, it is even beneficial to maintain, at this roasting stage, the hulls with the kernels as the hulls protect the kernels during the heating, and particularly the surface area of the kernels.

In some embodiments, roasting is terminated when the moisture content is considered suitable for further processing. In some embodiments, the moisture content following roasting is between about 0.1% to about 10%, at times between about 0.5% to about 5%, further at times between about 0.7% to about 2%. In some embodiments, the moisture content after roasting is between about 1.0% to about 1.8%, or not more than 1.5%±0.2%.

In some embodiments, roasting is for a time period of between 60 min to 100 min, at times between 70 min to 90 min, further at times, for about 80 min±5 min.

The roasted kernels are then cooled. In some embodiments, cooling is to a temperature from about 10° C. to about 45° C. In some other embodiments, cooling is to a temperature from about 20° C. to about 30° C., at times to a temperature of about 22° C.±3° C. In some embodiments, cooling is by a blower that while reduces the temperature of the kernels, also separates the hulls from the kernels which are then removed to obtain separated kernels using a sifter having mesh openings of between 0.5 mm to 1.5 mm, at times, around 0.8±0.2 mm.

After cooling, the roasted kernels are subjected to a size reduction step. This includes any one or combination of crushing, grinding and milling.

In some embodiments, the roasted kernels are subjected to a step-wise size reduction process. Preferably, the roasted kernels are initially subjected to a first grinding step to obtain crushed roasted kernels which are further subjected to a second step-wise grinding step. In the context of the present disclosure, the term "roasted kernels" encompass also "roasted crushed kernels".

The initial grinding process (crushing) comprises any conventional technique known in the food industry, and in particular, in the sesame seeds grinding industry, to obtain crushed hulled kernels. The initial/first grinding, irrespective of the particular procedure employed, brings the sesame kernels into a particle size which is above 40 µm (the size of particles in most conventional raw Tahini), without damaging the protein quality therein. The first grinding can be conducted, without being limited thereto, using ball mills. The first grinding thus provides particles size of more than 40 µm and an intermediate product having a viscosity of more than 2,500 cps (typically more than even 4,000 cps).

The inventors have found that a applying a second, step-wise grinding step on the crushed roasted kernels is essential for obtaining the properties of the raw food product (the raw Tahini) with the characteristics as disclosed and defined herein. The further step wise grindings are by a mill ball system where the roasted crushed kernels are subjected to several sequential ball mill grinding stages.

In this connection it is noted that the sequential milling stages can be under the same or different condition from each other (i.e. each milling stage may be at the same of different condition from any of its preceding or following milling stages). In some embodiments, the different millings are essentially under the same conditions.

When referring to the milling conditions it is to be understood as including at least temperature and degree of impact applied (determined, inter alia, by the shell's rotation, size of balls etc.)

A ball mill as used herein denotes a slightly inclined or horizontal rotating cylinder that is partially filled with balls, usually stone or metal (such as zirconium), and upon operation, the balls grind material within the cylinder to the necessary fineness by friction and impact with the tumbling balls.

The inventors have surprisingly found that using at least two, or even at least three or even at least four and at times, preferably between 4-8 sequential grinding (milling) steps produce at the end of each grinding stage an essentially homogenous particle size population, while subjecting roasted kernels to a single grinding/milling step, for a longer time period resulted in heterogeneous particle sizes. A long milling was also found to damage the protein quality due to the long heating in the milling device (burning the oil).

Figure 2:
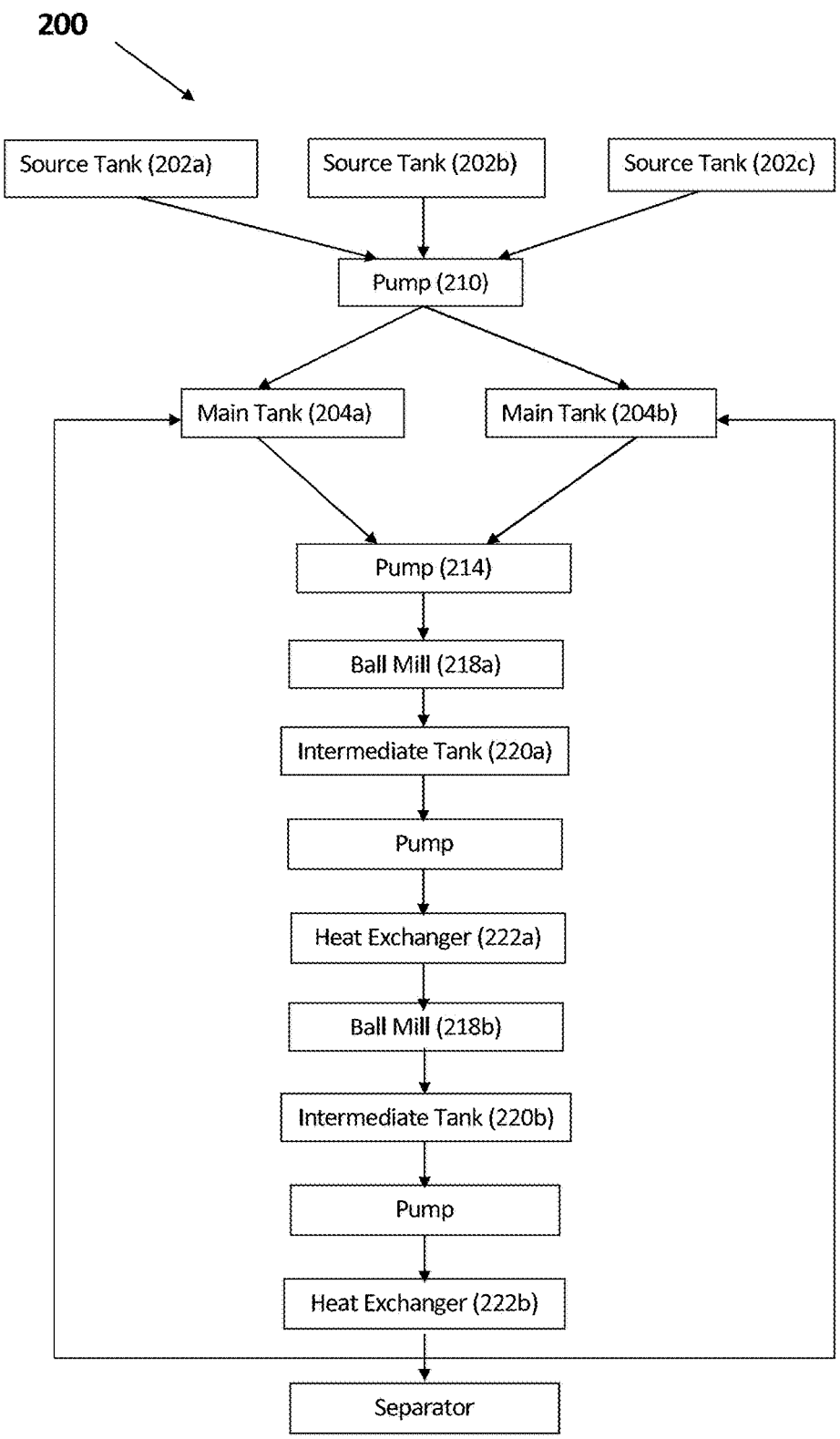
FIG. 2 is a flow chart of a milling process in accordance with an embodiment of the present disclosure.

In some embodiments, the crushed kernels are subjected to between 2 to 10, at times, 6 to 9 or 8 sequential milling steps. In some other embodiments, the crushed kernels are subjected to four sequential cycles of milling steps as illustrated in FIGS. 1 and 2 (which amount to a total of 8 grinding stages). As appreciated, the sequential steps may be done using one ball mill, or several mills operated in series. In some embodiments, grinding involves four milling cycles as illustrated in FIGS. 1 and 2.

In some embodiments, at least a portion of the grinding step involves also heating the kernels while subjecting them to the crushing/milling stages. To this end, the grinder (preferably ball mill) is heated during operation. In some embodiments, the grinding is conducted at a temperature that promotes fluidity of the oil carrying the particles. In some embodiments, grinding is at a device's temperature of between about 30° C. to about 70° C., at times, at a device temperature of between about 30° C. to about 60° C., until the particles reach desired size. After each milling stage, the resulting particles are cooled to about room temperature before being subjected to another round of milling.

At the end of the milling stages, the particles reach an average size of 25 µm (e.g. after several millings, e.g. after the $8^{th}$ time in milling in a ball mill).

The product comprising particles with an average size of about 25 µm, is considered to be the raw food product. Further or alternatively, the product comprising particles with an average size of about 25 µm and a viscosity of no more than 2,500 cps, is considered to be the raw food product.

This raw food product is collected and/or may be further processed for packaging.

A schematic representation of a system for milling the kernels into the raw food product, is described above is illustrated in FIG. 1.

Specifically shown is a milling system 100 to be used on grind sesame seeds having an average size of about 40 μm (after being subjected to some crushing and grinding). The system 100 includes a farm of source tanks filled with initially grinded sesame seeds (about 40 μm), in this particular embodiment, the farm includes three source tanks 102a, 102b, 102c. Source tanks 102a, 102b and 102c are connected to two main tanks 104a and 104b. The transfer of seeds from source tanks 102a, 102b and/or 102c to main tanks 104a or 104b is via reservoir pipe 106 and respective inlet pipes 108a and 108b, operated by respective valves 102va, 102vb, 102vc, 104va and 104vb and pump 110. As appreciated, the use of two main tanks allows the process to be conducted as a continuous process, such that when one is in open configuration, the other is in closed configuration. For Example, when main tank 104a is closed by discharge valve 112va, discharge valve 112vb is open, allowing seeds to be discharged from main tank 104b. Both main tanks are operated using pump 114.

Ground seeds (about 40 μm) are discharged from main tank 104a or 104b and subjected to a sequence milling stages using ball milling units, illustrated in this non-limiting embodiment by two sets of ball mill units 116a and 116b, each containing, respectively, a ball mil device 118a or 118b, followed by an intermediate tank 120a or 120b subsequently a heat exchanger 122a or 122b, the latter is used to cool the milled product from a temperature of about 60° C. (the temperature in the ball mill) to a temperature around room temperature (~19° C. to ~30° C.). It is noted that particles exiting a ball mill can be returned/circulated into the ball mill for further processing before being cooled by the heat exchanger.

It has been found by the inventors that in order to obtain the unique features of the raw Tahini product of the present disclosure several short millings in addition to the conventional milling (to a size of 40 μm) are required.

To further mill the particulate product, i.e. to repeat the milling stage, milled particles exiting heat exchanger 122b are re-introduced into ball mill unit 116a via milling pipe 124. Each milling stage reduces the size and homogenizes the size of the thus produced particles until reaching the desired size and homogeneity, as further discussed herein. The reintroduction into mill unit 116a may be repeated until the particles have reached the desired average size being essentially homogenous size.

In some embodiments, at the end of at least 4, at times, at least 5, 6, 7 and preferably 8 such additional milling stages reach the desired average size and the thus produced raw product are transferred to storage in storage tank 130 and packing. The transfer of the end product (the product of desired particle size) is operated by valve 130v. At times, before storing, the raw product is filtered.

The operation of the milling stages is also illustrated in FIG. 2 as a flow chart. For simplicity, the same reference number used in FIG. 1 will be used in FIG. 2, shifted by 100, to designate the same elements. Thus, for example, a main tank 104a will be referred to in FIG. 2 as main tank 204a. Specifically illustrated in FIG. 2 is a process 200 comprising first delivery of roasted and sifted kernels from reservoir tanks 202a, 202b and 202c, in into two separate main tanks 204a and 204b by the operation of pump 210. As noted above, the separation of the kernels into two main containers is merely for the sake of allowing continuity, such that when one tank is refilled, the other is being used. Roasted kernel is then transported, using pump 214 into a $1^{st}$ ball mill 216a. From $1^{st}$ intermediate tank 220a the fluid containing particles is cooled in a heat exchanger 222a. The cooling is to about room temperature as described above and illustrated in this non-limiting embodiment by the use of cooling water (being introduced into the jacket of the heat exchanger). The cooled particles are then transferred to a $2^{nd}$ ball mill 216b. These particles are transferred into a $2^{nd}$ intermediate tank 220b and subsequently cooled in heat exchanger 222b. The process is repeated as illustrated by return line 250, until reaching the desired average particles size of about 25 μm.

Once in the desired average particle size, the raw food product (raw Tahini) thus obtained is collected. In some embodiments, the raw food product is collected into a storage unit (container) where it is maintained until further processing (e.g. packaging). To ensure stable storage conditions, the collection into storage unit is under controlled atmosphere, including, in accordance with some embodiments, anoxic environment. In some embodiments, an anoxic environment includes nitrogen atmosphere. In addition, the storage container is preferably maintained at room temperature and under contentious slow mixing (about 5-10 rpm).

In some embodiments, the raw food product can be transferred into individual containers, e.g. bottles, sachets, or other small volume containers for use by the end consumer.

In some embodiments, the container is at least partially flexible, inter alia, to allow squeezing out of the raw product thereof. In some embodiments, the container is a plastic bottle, e.g. polypropylene bottle. In some embodiments, the container is a squeezable bottle, e.g. a squeezable down-up bottle or up-down bottle.

In some embodiments, the individual (small volume) containers are squeezable containers having a capacity for holding between 250 to 1,500 grams of raw food product, at times 250±50 gram of raw food product.

In some aspects, the raw food product is further process by at least diluting it with an aqueous medium. In some embodiments, the aqueous medium is water. In some alternative embodiments, the aqueous medium is lemon juice. In yet some other embodiments, the dilution may be with any water based medium.

The dilution of the raw product is typically by stirring (mixing) the raw food product with the aqueous medium until a homogenous blend is obtained. In some embodiments, the raw product is also mixed with other food components.

The resulting homogenous blend is referred to herein as a "ready for use" food product. The ready for use product inherently has a viscosity that is less than that of the raw food product.

The amount of aqueous medium to be mixed with the raw material is not limited to a particular range and depends solely on the consumer's personal taste. Nonetheless, as mentioned above, the raw food product disclosed herein can hold a water volume greater than other commercial Tahini products. In addition, it has been found by the inventors that the mixing with water is relatively longer and less shear forces are required, (i.e. mixing is easier) than that with commercial raw Tahini. Without being bound by theory, it is believed that due to the large surface area of the proteins in the raw food product disclosed herein, the inversion point of the emulsion is longer.

As described herein below in the Examples, the raw food product and the commercial Tahini were tasted by volunteers. The ready for use food product was determined to have a smoother texture, with no stinging feeling usually felt with raw Tahini (commercial/prepared by other methods). The ready for use food product was also determined to be sweeter as compared to the commercial reference Tahini.

Non-Limiting Examples

Materials and Methods:

An Ethiopian line of sesame seeds (*Sesamum Indicum*, Ethiopian Withish seeds, Humera type, Certificate of Ethiopian Chamber of Commerce and Sectorial Association No. 156295) characterized by a characterized by a weight of 20 mg to 40 mg and dimensions: length between 3 mm to 4 mm, width 2 mm and thickness 1 mm, 4-6% moisture, 50-57% fat and 22-27% protein was used.

The seeds were sifted using a 1-1.2 mm sifter.

The sifted seeds were then continuously washed with water to remove pesticides and the like, and then suspended in clean water for 20 to 30 minutes. The soaked seeds where then pealed in a wet-pealing process during which separation between the seed coat (bran, hull) and the kernel was achieved. De-coating was conducted by gentle mixing in a blender at a spin rate of 170 rpm to 220 rpm (without applying pressure on the seeds, to avoid breaking of the seeds), while maintaining the moisture of the seeds in the range of 39%-46%.

The de-coated kernels were roasted, using a steam oven, at a temperature around 120° C. During the roasting period samples of kernels are extracted in hexane to verify quality of the kernels and in particular, protein content and quality. The moisture of the roasted kernels at the end of the process was determined to be about 1.5%.

The kernels are then cooled to a temperature of 20° C.-30° C. Residual hull is removed by sifting the roasted kernels. The kernels had an average size of 210 µM which are then transferred to the milling stage.

Specifically, the kernels were collected and initially ground to obtain particles of average size of 40 µm, as known in the industry, and then further ground in two sequential ball mills (total passings through a ball mill of 8 times), maintained at a temperature of 30° C.-80° C. in accordance with the process steps illustrated in FIGS. 1 and 2.

As shown, overall, the kernels were passed through four ball mills. After the first ball mill, the average size of the crushed kernels was 120 µm; after a second ball mill the crushed product had an average size of about 80 µm; after the third ball mill the crushed product had an average size of 40 µm and after the fourth ball mill the crushed kernels has an average size of 25 µm.

The resulting product was a smooth raw Tahini product.

The raw tahini product was packaged in squeezable containers for commercial use.

The resulting liquid Tahini was characterized as:
having an average particles size in the fluid Tahini of about 40 µm±20 µm;
being thixotropic with a viscosity, at rest, of about 1,000 cps to 2,000 cps;
capable of holding at least 1.2 times water, i.e. mixing with water at a Tahini to water ratio of at least 1.2 to 1 provided a homogenous stable rood product.
protein content of 30% more than the protein content in commercial raw Tahini;
stable with no phase separation or oiling off for a period of at least 6 month when stored at room temperature;
smooth texture, with no stinging feeling usually felt with raw Tahini and sweeter taste (as determined by tasters).

The invention claimed is:

1. A method for preparing food product comprising particles of ground roasted sesame seeds dispersed in sesame oil, the particles having an average size of between about 15 µm to about 40 µm, the food product being thixotropic, having a viscosity of between about 700 cps to about 2,500 cps and storage stable as a single liquid phase for a time period of at least six months when stored at room temperature, the method comprising:
hulling sesame seeds by stirring sesame seeds, suspended in an aqueous media, at a velocity of less than 400 rpm, to obtain sesame kernels;
roasting the sesame kernels to obtain roasted kernels; and
subjecting the roasted kernels to from 4 to 8 milling stages in a ball mill device, each milling stage is independently at a temperature of between 30° C. to 80° C., to obtain said food product.

2. The method of claim 1, further comprising, prior to milling, crushing the roasted kernels to obtain crushed kernels of a size of at least 40 µm.

3. The method of claim 1, wherein the sesame seeds, before hulling, comprise:
an average seed length about 3 mm to about 4 mm, width about 2 mm and thickness about 1 mm,
about 4% w/w to about 6% w/w moisture,
about 50% w/w to about 60% w/w oil content; and
at least 20% w/w protein content.

4. The method of claim 1, further comprising sifting in a 0.75-1.7 mm sifter the sesame seeds prior to hulling.

5. The method of claim 1, further comprising, prior to hulling, washing sesame seeds with water for a period of at least 10 minutes.

6. The method of claim 1, wherein said stirring is at a velocity of about 170 rpm to about 220 rpm.

7. The method of claim 1, wherein said roasting is at a temperature of between 100° C. to 130° C.

8. The method of claim 1, wherein said roasting is for a time period of between 60 min to 100 min.

9. The method of claim 1, further comprising cooling the roasted kernels to a temperature from about 20° C. to about 30° C.

10. The method of claim 1, wherein the roasted kernels are subjected to from 6 to 8 milling stages.

11. The method of claim 1, wherein the roasted kernels are subjected to comprising 8 sequential milling stages.

12. The method of claim 1, further comprising collecting, under anoxic conditions, food product obtained from said milling into a storage unit.

13. The method of claim 1, further comprising packaging the food product in squeezable containers, wherein each of said squeezable container has a capacity for packing between 250 to 1,500 gram of food product.

14. A method for preparing food product comprising particles of ground roasted sesame seeds dispersed in sesame oil, the particles having an average size of between about 15 µm to about 40 µm, the food product being thixotropic, having a viscosity of between about 700 cps to about 2,500 cps and storage stable as a single liquid phase for a time period of at least six months when stored at room temperature, the method comprising:
hulling sesame seeds by stirring sesame seeds, suspended in an aqueous media, at a velocity of less than 400 rpm, to obtain sesame kernels;

roasting the sesame kernels to obtain roasted kernels; and
subjecting the roasted kernels to four or more milling stages in a ball mill device to obtain said food product.

15. The method of claim 14, each milling stage is independently at a temperature of between 30° C. to 80° C.

* * * * *